United States Patent
Chakrabarti et al.

(10) Patent No.: US 7,561,694 B1
(45) Date of Patent: Jul. 14, 2009

(54) SESSION MOBILITY FOR WIRELESS DEVICES

(75) Inventors: Samita Chakrabarti, Menlo Park, CA (US); Gabriel E. Montenegro, Fremont, CA (US); Randall B. Smith, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 831 days.

(21) Appl. No.: 11/108,273

(22) Filed: Apr. 18, 2005

(51) Int. Cl.
*H04K 1/00* (2006.01)

(52) U.S. Cl. .................. 380/270; 713/171

(58) Field of Classification Search .......... 380/270
See application file for complete search history.

(56) References Cited

U.S. PATENT DOCUMENTS

| | | | | |
|---|---|---|---|---|
| 4,473,905 A | * | 9/1984 | Katz et al. | 381/70 |
| 4,502,150 A | * | 2/1985 | Katz et al. | 381/70 |
| 4,550,427 A | * | 10/1985 | Katz et al. | 381/70 |
| 4,577,160 A | * | 3/1986 | Lettvin et al. | 330/149 |
| 4,626,847 A | * | 12/1986 | Zato | 340/825.56 |
| 4,942,534 A | * | 7/1990 | Yokoyama et al. | 700/9 |
| 5,438,362 A | * | 8/1995 | Tabuchi | 348/211.5 |
| 5,528,660 A | * | 6/1996 | Heins et al. | 379/21 |
| 5,764,644 A | * | 6/1998 | Miska et al. | 370/465 |
| 5,767,494 A | * | 6/1998 | Matsueda et al. | 235/454 |
| 2003/0112977 A1 | * | 6/2003 | Ray et al. | 380/270 |
| 2004/0053622 A1 | * | 3/2004 | Nakakita et al. | 455/450 |
| 2006/0251256 A1 | * | 11/2006 | Asokan et al. | 380/270 |

\* cited by examiner

*Primary Examiner*—Kambiz Zand
*Assistant Examiner*—Yonas Bayou
(74) *Attorney, Agent, or Firm*—Osha • Liang LLP

(57) ABSTRACT

A wireless system includes at least one network computing system, a proxy server, a controller, and wireless devices. When a wireless device is already a member of a first group but moves into range of a second group, that device may initiate a request to join the second group, thereby ensuring that the wireless device can send and receive information through the second group. The proxy server maintains a list of authorized wireless devices and their primary controller, thereby routing information from one or more network computing systems to the proper controller, so that the wireless device may receive information from one of those network computing systems as necessary. When the wireless device becomes joined to a new controller, the proxy updates its list, thus ensuring continuity between the wireless device and the one or more network computing systems.

21 Claims, 3 Drawing Sheets

SESSION MOBILITY FOR WIRELESS DEVICES

BACKGROUND

Wireless devices exist in everyday life, transmitting position, measuring temperature, determining moisture content or chemical content of soil, determining whether a light is turned on or off, whether it is night or day, etc. Those devices range in size and can often be quite small. Wireless devices may be used to provide sensory data or other information, control actions, or provide computing services, through wireless means to a controller which operates on that data or information in some manner.

On occasion, a wireless device may be in a stationary position for a period of time and be relocated. Or, a wireless device may move regularly, such as between rooms of a house, or between different fields on a farm. When a wireless device moves from one location to another, the wireless device may move out of range of one controller, and into range of a different controller within the same wireless system. At some points, a wireless device may be at a location which is within wireless range of more than one controller.

SUMMARY

In general, in one aspect, a method for operating a wireless system includes receiving request from a first wireless device to join a wireless group within the system. The join request includes wireless device identity information of the first device and group membership information indicating membership in a second group of wireless devices. The method further includes verifying that the first wireless device is an authorized member of the second group of wireless devices, authorizing the first wireless device to join the first group of wireless devices on the basis of that device being an authorized member of the second group, and adding the first wireless device identity information to a list of authorized first group wireless devices. The wireless device identity information may be added to a list of authorized wireless devices belonging to the first group. This list may also include routing information indicating a routing pathway to use for information being sent to the first wireless device from a first computing system.

In general, in one aspect, a wireless system includes a first group controller and a first wireless device having identity information and wirelessly coupled to the first group controller. The first group controller is configured to receive a join request from a wireless device, the join request including device identity information and membership information indicating membership in a second group of wireless devices. The controller is further configured to verify the membership information as authentic, and to authorize the wireless device to join the first group on the basis that device already being an authorized member of the second group. The controller may be further configured to add the device identity information to a list of authorized first group wireless devices.

Other aspects of the invention will be apparent from the following description and the appended claims.

DETAILED DESCRIPTION

Figure 1:
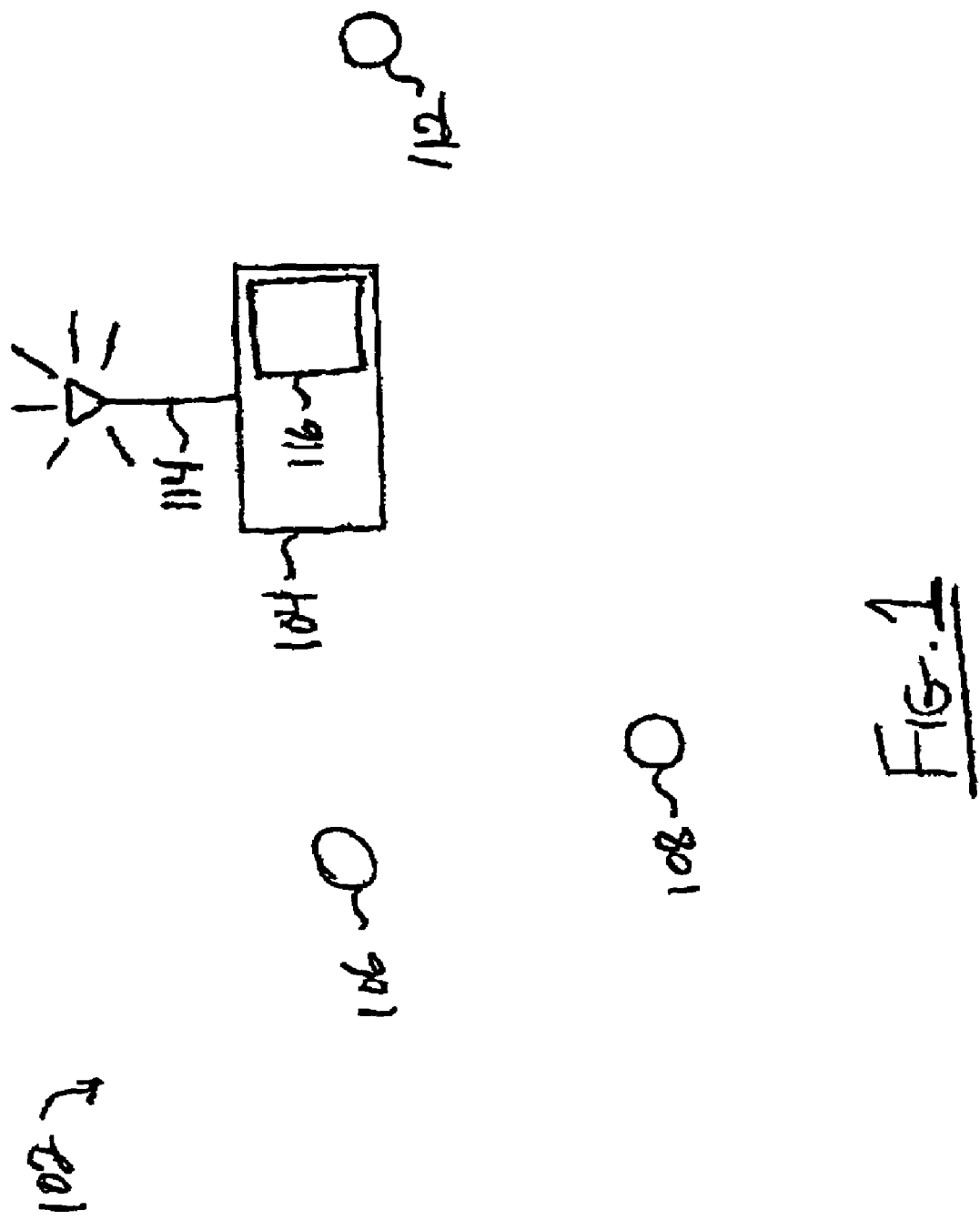
FIG. 1 shows a functional block diagram of a wireless system according to one or more embodiments of the present invention.

Exemplary embodiments of the invention will be described with reference to the accompanying drawings. Like items in the drawings are shown with the same reference numbers.

In this specification, it is intended that the term "coupled" describe devices which interact with each other, directly or indirectly. For example, first and second devices that interact with each other through a transmission line between the two devices are directly coupled. Further, first and second devices that have intermediate devices disposed between them, and interact with one another through those intermediate devices, are indirectly coupled. In both situations, the first and second devices are considered coupled.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a wireless device network and a method for ensuring that a wireless device that is already authorized by and joined to a wireless system, may move into and out of range of different controllers, while still being authorized to access system information. Further, embodiments of the invention relate to a method for ensuring that messages sent to and received from wireless devices arrive at their intended destination regardless of where in the system a given wireless device may be at any given time.

FIG. 1 is a functional block diagram of a system of wireless devices according to the present invention. In one or more embodiments of the present invention, system 102 includes controller 104 and wireless devices 106, 108, and 112. Wireless devices 106, 108, and 112 receive information from and transmit information to one or more other devices (e.g., to and from controller 104, from one wireless device to another, etc.) using wireless means, such as radio frequency.

Controller 104 includes antenna 114, used to transmit information to and receive information from wireless devices 106, 108, and 112. Controller 104 may further include storage media 116 within which a system list (not shown) is stored, including a list of active and authorized wireless devices in the system 102, etc. Such a list includes, but is not limited to a set of database records, a flat file located within a computing file system, or one or more entries, contiguous or not contiguous within a storage media, a distributed structure within a networked environment, etc.

Storage media 116 may include any type of memory desired by a designer of wireless system 202, such as flash memory, electrically erasable programmable read only memory, volatile or nonvolatile random access memory, a hard disk drive, or any other suitable storage media. Storage media 116 needs to be available to controller 104 but need not be located directly on controller 104.

Controller 104 is configured to manage wireless device communication and to act on information provided by wireless devices, e.g., wireless devices 106, 108, and 112. In one or more embodiments of the present invention, controller 104 may be instantiated as a state machine incorporated into a larger system. Alternatively, in one or more embodiments of the present invention, controller 104 should be thought of as a set of functions, rather than a particular device. Thus, functions performed by a controller, such as controller 104, may be incorporated into one or more wireless devices or other devices which may operate to perform one or more functions normally thought of as relating to a controller, in addition to performing functions normally attributed to wireless devices, such as monitoring environmental conditions, providing position data, etc.

In one or more embodiments of the present invention, in order to securely establish a wireless system, e.g., wireless system 102, an initialization process is performed during which certain information is exchanged between a new wireless device and the controller 104. Additional information regarding one method for initializing a wireless device such as a sensor may be found in related U.S. patent application Ser. No. 11/083,494 filed Mar. 18, 2005.

Once the initialization process is complete, a wireless device typically has a device identifier, a public and private key pair, and the public key of the controller with which the wireless device is most likely to first interact with when joining the system.

As with initialization, a first joining process is explained in detail in the patent application referenced above. Once a wireless device is joined into a group within a wireless system, the controller (such as controller 104 of FIG. 1) may have a list of wireless devices which have been authorized to send and receive messages within the group of wireless devices controlled by that controller. In systems having larger numbers of wireless devices wirelessly coupled with multiple controllers, multiple groups may exist, with multiple wireless devices in each group. Each group may have its own controller, especially if different groups are separated by distance, making it less likely that all wireless devices are within communication range of one controller.

Figure 2:
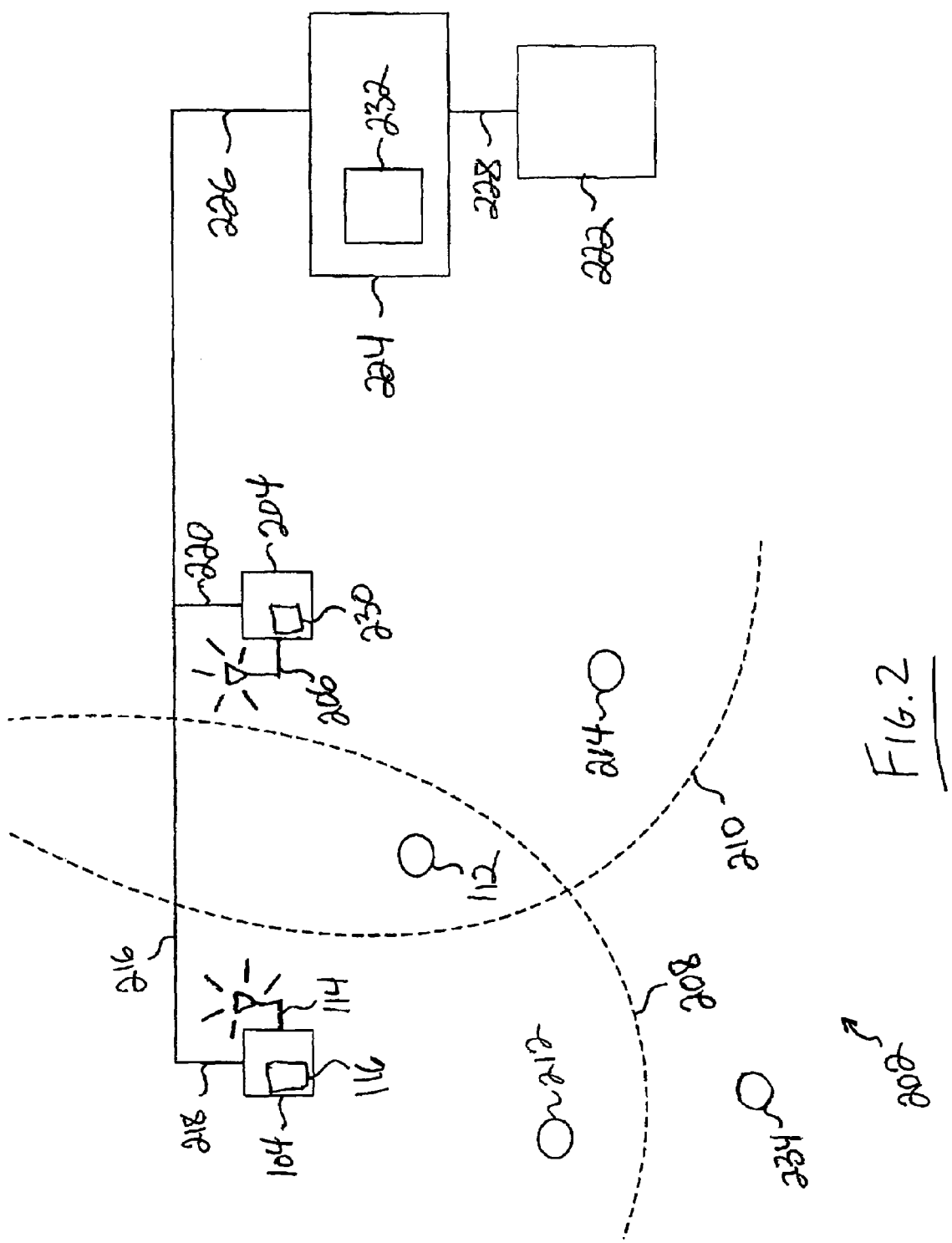
FIG. 2 shows a functional block diagram of a wireless system according to one or more embodiments of the present invention.

FIG. 2 shows a functional block diagram of a wireless system according to one or more embodiments of the present invention. Wireless system 202 includes controllers 104 and 204 having respective antennas 114 and 206. Each of those controllers 104 and 204 are associated with communication ranges 208 and 210 respectively, within which each individual controller may communicate wirelessly with authorized wireless devices. Thus, assuming proper authorization, controller 104 and wireless devices 112 and 212 may each communicate with the other. Correspondingly, assuming proper authorization, controller 204 and wireless devices 112 and 214 may each communicate with the other.

Wireless device 112, being within the wireless range of each of controllers 104 and 204, is capable of communicating with either group of wireless devices, if authorized to do so. However, if authentication and encryption processes are being employed in either of the two groups shown in FIG. 2, the two groups will likely be using different keys for authentication and encryption. Thus, wireless device 112 may be able to receive information originating within either group, but is only able to understand information originating within groups that wireless device 112 is authorized into, and has the proper keys with which to decrypt and verify the received information, as necessary.

Controllers 104 and 204 are coupled together through transmission lines 216, 218, and 220. Further, controllers 104 and 204 are coupled to network computing system 222 through proxy server 224 over transmission lines 226 and 228. Network computing system 222 is one example of many computing systems that may have applications or other processes running which have a need to exchange data with one or more wireless devices within system 202.

It is expected that network computing system 222 and proxy server 224 are likely to be coupled through one or more devices to the internet. Therefore, at least portions of network computing system 222 and proxy server 224 are capable of handling network traffic using common internet-related protocols such as Transport Control Protocol/Internet Protocol (TCP/IP), User Datagram Protocol (UDP), and Hypertext Transfer Protocol (HTTP). Controllers 104 and 204 may be capable of handling TCP/IP packets from proxy 224 as well as handling wireless device packets, and converting between the two types of protocols. Further, any of the functionality of proxy server 224 may be combined with controller functionality to form a combined device capable of performing both roles. Finally, proxy server 224 functionality may be distributed among multiple controllers, if desired, so that incoming packets bound for given wireless devices pass through a device that has access to a list of wireless devices showing which controller is associated with the current position of the wireless device at the time a packet of information arrives at the proxy (or equivalent) on its way to the given wireless device.

When discussing wireless system 102 having a single group of wireless devices, storage media 116 was described, within which a system list (not shown) may be stored, including a list of active and authorized wireless devices in wireless system 102. In wireless system 202, a given controller may have a local storage media such as storage media 116 within controller 104, and storage media 230 within controller 204. Alternatively, or in addition to (depending on system design), proxy server 224 may have a storage media 232 within which information about wireless devices in various groups may be stored. Such information may include, but is not limited to, wireless device public keys, pairwise keys for wireless devices and controllers in the system, etc.

When wireless devices desire to communicate with each other, or when communicating with a controller, it may be desirable to have authenticated communication. In some circumstances, it may be desirable to have secrecy as well, which creates a requirement for encrypted communication.

According to one or more embodiments of the present invention, where authentication of transmitted information is desirable, such information may be digitally signed by the originator (wireless device or controller, as appropriate) prior to being transmitted. Persons of ordinary skill in the art will readily appreciate that any suitable public key method may be employed to digitally sign the information, such as Rivest Shamir Adleman (RSA) Algorithm, Elliptic Curve Cryptography (including using Diffie-Hellman-style shared keys), etc.

In a second configuration, in systems where data secrecy is an issue, encryption techniques may be employed within wireless devices and controllers to encrypt information prior to transmission, and to decrypt information after receipt. When using encryption, the transmitted encrypted information is not easily able to be intercepted and understood by unauthorized parties.

In one or more embodiments of the present invention, a wireless system configuration includes one or more controllers (e.g., controller 104) and one or more wireless devices (e.g., wireless device 212) each configured to transmit and receive encrypted data. Any of the various well known encryption algorithms may be employed, using public keys, pairwise keys, or group keys that provide such functionality. Persons of ordinary skill in the art having the benefit of this disclosure will readily appreciate that other key types or data authentication methods may be employed, while remaining within the scope and spirit of the invention.

Pairwise keys are known to persons of ordinary skill in the art. Briefly, pairwise keys are used between a message originator and a receiver. The public key of the receiver and the private key of the originator are used to create a new pairwise key which may be used to digitally sign or encrypt messages, as may be appropriate.

A group key is used for digitally signing messages sent within the group. If desired, group keys may be developed and used that allow for encryption and decryption processes to be performed on information.

In one or more embodiments of the present invention, a group key is a hash of the pairwise keys of the various wireless devices present in a given group within the wireless system. For example, in wireless system 202, a first group having controller 104, and wireless devices 112, 212, and 234, the group key is of the form $H(P_{112}, P_{212}, P_{234})$, where H represents a hash function of the pairwise keys of the respective wireless devices. Persons of ordinary skill in the art having the benefit of this disclosure will readily understand that the hash function used in one or more embodiments of the present invention may vary, as long as the result is a reliable group key.

Continuing with the example, a second group having controller 204, and wireless devices 112 and 214, the group key is of the form $H(P_{112}, P_{214})$, where H represents a hash function of the pairwise keys of the respective wireless devices. In this example, wireless device 112 is a member of both groups.

By the time a wireless device is joined into a group within a wireless system (such as wireless system 202) and is authorized to send and receive information within that group, a controller (such as controller 104) and a wireless device (such as wireless device 212) each possess a key pair for use when signing data, encrypting data, or both. A key pair typically includes a public key and a private key, with the private key being kept secret within the device that created it. The public key is transmitted to others, for use when authenticating messages sent by the device that is associated with that public key. The public key may also be used by a receiving device when creating a pairwise key for use in encryption, if desired.

Persons of ordinary skill in the art having the benefit of this disclosure will readily understand public key techniques that may be employed in the practice of the present invention. Such technologies may include Elliptic Curve Cryptography, RSA, etc. Some public key methods are primarily used for authentication (e.g., through the use of digital signatures) while others additionally provide data security through encryption of the information to be transmitted.

Further, in order to communicate within a given group, wireless devices have unique identifiers which allow the controllers to properly differentiate between wireless devices when sending and receiving messages. Such an identifier may be a collection of bits arranged in a unique order, a crypto-based identifier, or another identifier desired by system designers. Additional information relating to identity and addressing of wireless devices and wireless device networks may be found in U.S. patent application Ser. No. 11/104,828 filed on Apr. 13, 2005.

By the time a wireless device has been joined into a group, public keys have been exchanged between the wireless device (e.g., wireless device 210) and the controller (e.g., controller 104), and the each thus has the information each needs to create a pairwise key which is used to authenticate information sent by one to the other. Other authentication or verification means may be employed, such as the use of message authentication codes (MAC's). In one or more embodiments of the present invention, information sent by the controller to wireless devices or by wireless devices to the controller includes a MAC.

If additional security is desired, pairwise keys suitable for encryption of data may also be created, based on the public and private keys the wireless device and the controller possess.

In a wireless system, such as wireless system 202, wireless devices may be mobile. At times, when mobile, a previously authorized wireless device (such as device 212) may be within direct communications range (such as range 208). Thus, controller 104 receives information directly from wireless device 212 without the use of intermediate devices to retransmit the information.

In one or more embodiments of the present invention, wireless device 234 is beyond the direct RF range of controller 104. When a controller, such as controller 104, and a wireless device, such as wireless device 234, are not within direct RF communication range, information transmitted between controller 104 and wireless device 234 may be relayed using one or more intermediate devices, such as wireless device 212, which is within direct communication range of controller 104.

Further, in one or more embodiments of the present invention, multiple intermediate points may exist in an information path between a given wireless device and a controller. Thus, information destined for a given wireless device may pass through several intermediate wireless devices before arriving at its final destination.

Using one or more intermediate devices (e.g., such as wireless device 212) to retransmit messages to or from controller 104 significantly increases the size of the effective range of controller 104 and thus also increases the size of the area where wireless devices may be located at any given time and still be able to provide information to and receive information from the controller 104.

Information being sent around a wireless device network may vary considerably depending on system activities being performed during a given period of time. Processes may be running on first network system 222 that require interaction with wireless device 212. While wireless device 212 is within effective range of controller 104, information may be passed from network computing system 222 through proxy server 224 through controller 104 to wireless device 212. Because proxy server 224 contains information about the membership of wireless device 212 in one or more groups, proxy server 224 may use that information to determine which controller, e.g., controller 104, to use when communicating with wireless device 212.

If wireless device 212 moves out of effective communications range of controller 104, communication is lost between wireless device 212 and network computing system 222. When wireless device 212 moves into effective communications range of a different controller, such as controller 204, wireless device 212 is able to detect RF signals being transmitted between a variety of wireless devices, but is generally unable to understand what is being received due to not having the proper group key (if in use) or pairwise key with which to communicate with the controller.

In such a situation, when wireless device 212 cannot communicate with its previous controller e.g., controller 104, but detects the presence of RF packets of the correct form (even though wireless device 212 may not be able to understand some of the information contained in those packets) wireless device 212 initiates a join request with the new group. The new group in this example includes controller 204, wireless device 214 and possible wireless device 112.

Figure 3:
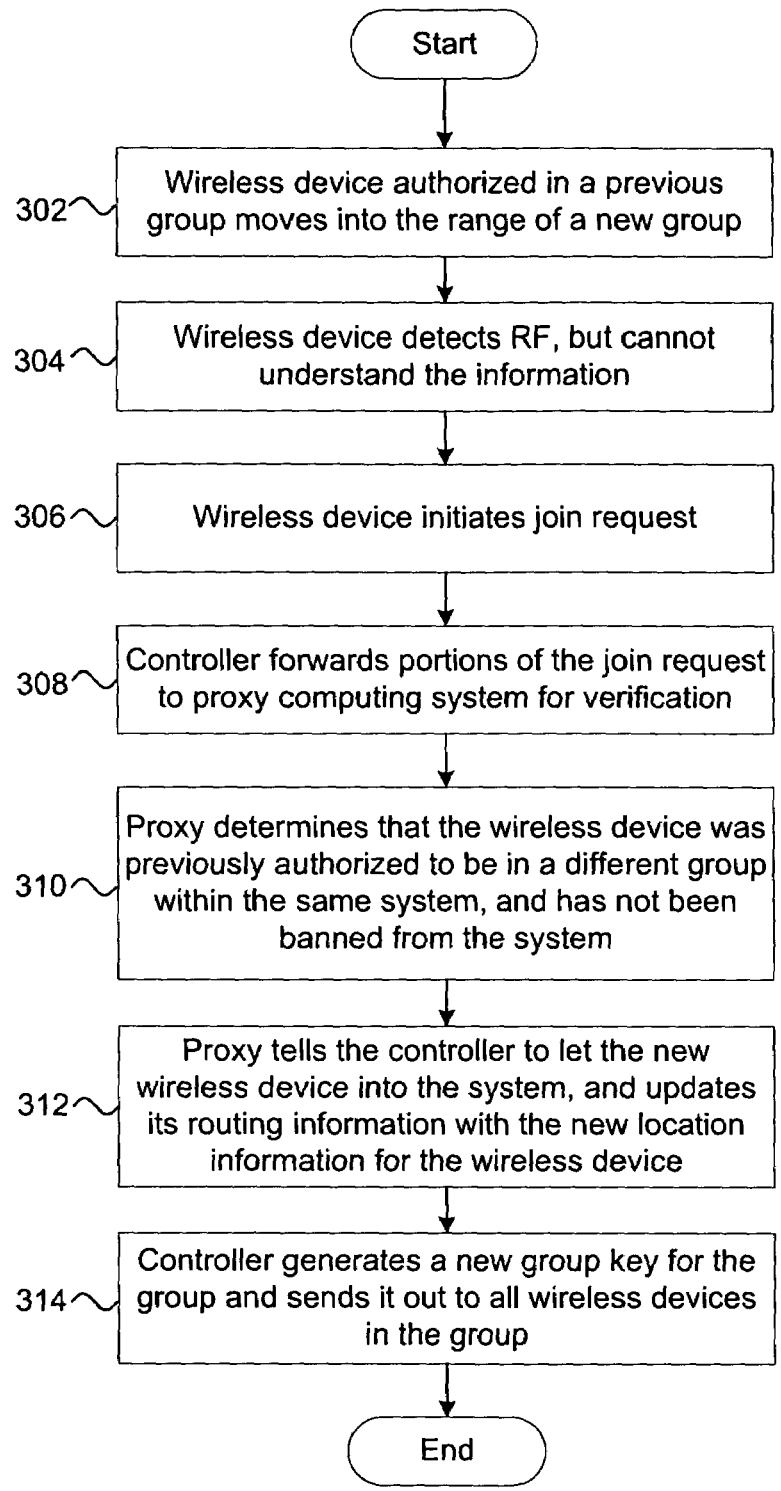
FIG. 3 shows a flowchart of a method according to one or more embodiments of the invention.

FIG. 3 shows a flowchart of a method according to one or more embodiments of the invention. At 302, a wireless device (such as wireless device 212) which has previously been a member of a first group moves into range of a second group (physical movement not reflected in FIG. 2). As previously discussed, at 304, this may mean that wireless device 212 is in direct communication range of controller 204. However, it may alternatively mean that wireless device 212 has moved within range of wireless device 214 and thus detects packets having a detectable format, but which do not originate from the original group including controller 104.

At 306, wireless device 212 initiates a join request to join the newly detected group. The join request is a message that typically includes a packet header including one or more bits indicating that the message is a join request. The packet header will also include the identifier used by the wireless device with the previous group. Although that identifier was unique within the previous group, the identifier may not be unique within the new group, depending on system design.

In one embodiment of the invention, the process of joining a wireless device into a particular group includes ensuring uniqueness of the wireless device identifier of the joining device within the group being joined. In one embodiment of the invention, the process of joining a wireless device into a particular group includes ensuring uniqueness of the wireless identifier of the joining device system wide. If the wireless device identifier is not unique, a new identifier may be provided to the wireless device.

Also included in the join request is information pertaining to one or more groups having the joining wireless device as a member. This information may include a portion protected (either authenticated or encrypted) with a group key known by the joining wireless device as being valid within the old group, the identifier associated with the controller of the old group, or any other suitable information deemed necessary by system designers.

The join request may be digitally signed or encrypted by the originator, to ensure authenticity and optional data secrecy, as desired.

The join request may be received directly by the controller, or may instead be received by an intermediate device and forwarded to the controller by that intermediate device. At 308, once controller 204 receives the request, controller 204 determines that the request is a join request, and there is information contained within the request that is either not understandable (due to encryption, signing, or for other reasons) or that pertains to previous membership in a different group within the system. At this time, controller 204 forwards that portion of the request to the proxy server 224 for further processing.

At 310, in one or more embodiments of the invention, proxy server 224 reviews the information contained in storage media 232 and determines that wireless device 212 has previously been an authorized group member of the group having controller 104, and has not been banned from the system for any reason.

In one or more embodiments of the invention, if the portion of the join request forwarded by controller 204 had been digitally signed by wireless device 212 prior to the join request being transmitted, proxy server 224 may authenticate that digital signature using the public key associated with wireless device 212. In one or more embodiments of the invention, if the portion of the join request forwarded by controller 204 had been authenticated using a MAC associated with wireless device 212 prior to the join request being transmitted, proxy server 224 may verify that MAC.

In one or more embodiments of the invention, once proxy server 224 has ensured that the join request is actually coming from a wireless device that has formerly been authorized and joined into a group within system 202 and has not been banned for any reason, proxy server 224 updates the list of authorized devices to indicate that wireless device 212 is now authorized into the new group having controller 204. In one or more embodiments of the invention, updating the list of authorized devices includes adding an entry in the list showing the wireless device 212 being authorized into the new group. In one or more embodiments of the invention, updating the list of authorized devices includes changing an entry in the list showing previous group membership to reflect wireless device 212 now belonging to the new group.

At this time, in one or more embodiments of the invention, if routing information is separate from the list of authorized wireless devices, routing information may be updated, if desired, to reflect a new information routing pathway for external information being directed to wireless device 212. In one or more embodiments of the invention, updating the routing information includes adding an entry in the routing information showing a new pathway to the wireless device 212 being authorized into the new group. In this embodiment, a system may then have the old routing information as well as the new routing information.

In one or more embodiments of the invention, updating the routing information includes changing an entry in the routing information to show a new pathway to the wireless device 212 being authorized into the new group.

Depending on system design, it may be desirable to have wireless devices only belong to one group at a time. In such a scenario, according to one or more embodiments of the invention, within a reasonable time before or after a wireless device is allowed to join a second group, membership information indicating that wireless device 212 is a member of the previous group is removed, invalidated, or is otherwise reflected as being superseded by newer information indicating the new group membership.

The condition of not allowing wireless devices to decrypt and review information transmitted after they have been removed from the system is called forward secrecy, because a removed wireless device cannot read data that was produced after that wireless device was removed from the system, or forward in time.

At this time, either of proxy server 224 or controller 104 may also verify whether the wireless device identifier for wireless device 212 is unique within the new group, in order to ensure that messages may be directed to the proper wireless device, and to ensure that the controller can accurately determine when a message has arrived from wireless device 212. Additional information relating to identifier and identity information uniqueness may be found in the previously cited U.S. patent application Ser. No. 11/104,828 filed on Apr. 13, 2005.

Once the desired operations have been completed, proxy server 224 notifies controller 204 that wireless device 212 is authorized to join the new group. Proxy server 224 may also provide controller 204 the public key associated with wireless device 212, in order for controller 204 to be able to create a pairwise key associated with wireless device 212, for use when sending information to wireless device 212, such as a new group key.

At block 314, the controller optionally generates a new group key that is shared by all devices for digitally signing or encrypting data within the group, and distributed that new group key to all group members, as may be appropriate. In one or more embodiments of the invention, the new group key is a hash of the pairwise keys of the various devices present in the wireless system. For example, in wireless system 202 having controller 204, and wireless devices 112, 212, and 214, the group key is of the form $H(P_{112}, P_{212}, P_{214})$, where H represents a hash function of the pairwise keys of the respective wireless devices. Persons of ordinary skill in the art having the benefit of this disclosure will readily understand that the hash function used in one or more embodiments of the invention may vary, as long as the result is a reliable group key.

Other methods for developing a group key may be employed. For example, in one or more embodiments of the invention, controller 204 determines a group key without using any of the pairwise keys, or alternatively using several of, but not all of the pairwise keys.

The development and use of a group key is optional, and is used primarily in those systems requiring higher levels of information security, such as when encryption of transmitted information is desired.

In order to distribute the new group key, it may be desirable for controller 204 to digitally sign or encrypt the new group key prior to transmission to each of the wireless devices in the group. To encrypt the group key properly for each device, controller 204 selects the appropriate pairwise key to use to encrypt the group key (depending on the device the group key is being sent to at any given time), for transmission to the wireless device that is associated with the selected pairwise key.

Following encryption of the group key using a given pairwise key, the controller sends the digitally signed or encrypted group key to the wireless device associated with the particular pairwise key.

By creating a new group key and sending that new group key to each wireless device in the group each time a wireless device is added to the group, newly joined wireless devices can participate in the sharing of data within the group. However, new wireless devices are not able to decrypt information which may have been received prior to the new group key being created and distributed, since the prior information was encrypted using a group key that the new wireless device does not have.

The condition of only allowing wireless devices to decrypt and review information transmitted after they have been properly joined to the system is called backward secrecy, because the newly joined wireless device cannot read data that was produced prior to that wireless device being accepted into the system, or backward in time.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating a wireless system comprising:
   receiving a join request from a first wireless device at a first group controller, wherein the first group controller is a member of a first group of wireless devices, and wherein the join request includes first wireless device identity information and second group membership information indicating membership in a second group of wireless devices;
   verifying that the first wireless device is an authorized member of the second group of wireless devices;
   authorizing the first wireless device to join the first group of wireless devices on the basis of the first wireless device being the authorized member of the second group of wireless devices; and
   sending a group key associated with the first group to the first wireless device,
   wherein the join request is generated by the first wireless device subsequent to moving into a first range of the first group of wireless devices from a second range of the second group of wireless devices and detecting a packet not originated from any of the second group of wireless devices.

2. The method of claim 1 further comprising:
   adding the first wireless device identity information to a list of authorized first group wireless devices.

3. The method of claim 2 wherein the list of authorized wireless devices belonging to the first group of wireless devices comprises routing information indicating a routing pathway to use for information being sent to the first wireless device from a first computing system coupled to the first controller.

4. The method of claim 3 wherein the list of authorized first group wireless devices is accessible to the first group controller through a second computing system coupled between the first computing system and the first group controller.

5. The method of claim 1 further comprising:
   removing the first wireless device identity information from a list of authorized second group wireless devices.

6. The method of claim 1 wherein the join request is digitally signed using a first group controller public key.

7. The method of claim 1 wherein at least a portion of the join request is verified by a MAC using a pairwise key created using a first wireless device public key and a first group controller private key.

8. The method of claim 1 wherein at least a portion of the join request is authenticated by a MAC using a pairwise key created using a first wireless device private key and a first group controller public key.

9. The method of claim 1 wherein at least a portion of the join request is encrypted using a key derived from a pairwise key created using a new wireless device private key and a first group controller public key.

10. A wireless system comprising:
    a first group controller;
    a first wireless device comprising a first wireless device identity information, wherein the first wireless device is wirelessly coupled to the first group controller;
    wherein the first group controller is configured to:
       receive a join request from a first wireless device, wherein the join request includes first wireless device identity information and second group membership information indicating membership in a second group of wireless devices;
       verifying that the second group membership information is authentic;
       authorizing the first wireless device to join a first group of wireless devices on the basis of the first wireless device being an authorized member of the second group of wireless devices; and
    sending a group key associated with the first group of wireless devices to the first wireless device,
    wherein the join request is generated by the first wireless device subsequent to moving into a first range of the first group of wireless devices from a second range of the second group of wireless devices and detecting a packet not originated from any of the second group of wireless devices.

11. The wireless system of claim 10 wherein the first group controller is further configured to add the first wireless device identity information to a list of authorized first group wireless devices.

12. The wireless system of claim 10 wherein the join request is digitally signed using a controller public key.

13. The wireless system of claim 10 wherein at least a portion of the join request is authenticated by a MAC using a pairwise key.

14. The wireless system of claim 10 wherein first wireless device identity information comprises a hash of a first wireless device public key.

15. The wireless system of claim 10 wherein at least a portion of the join request is encrypted using a private key associated with the first wireless device.

16. The wireless system of claim 10 wherein at least a portion of the join request is encrypted using a key derived from a pairwise key created using a first wireless device private key and a second group controller public key.

17. A computer readable medium having executable code stored thereon that when executed by a computer system implements a method for secure configuration of a wireless system comprising:
   receiving a join request from a first wireless device at a first group controller, wherein the first group controller is a member of a first group of wireless devices, and wherein the join request includes first wireless device identity information and second group membership information indicating membership in a second group of wireless devices;
   verifying that the first wireless device is an authorized member of the second group of wireless devices;
   authorizing the first wireless device to join the first group of wireless devices on the basis of the first wireless device being the authorized member of the second group of wireless devices; and
   sending a group key associated with the first group to the first wireless device,
   wherein the join request is generated by the first wireless device subsequent to moving into a first range of the first group of wireless devices from a second range of the second group of wireless devices and detecting a packet not originated from any of the second group of wireless devices.

18. The computer readable medium of claim 17 further comprising:
   adding the first wireless device identity information to a list of authorized first group wireless devices.

19. The computer readable medium of claim 17 wherein the list of authorized first group wireless devices comprises routing information indicating a routing pathway to use for information being sent to the first wireless device from a first computing system.

20. The computer readable medium of claim 17 wherein the list of authorized wireless devices belonging to the first group of wireless devices comprises routing information indicating a routing pathway to use for information being sent to the first wireless device from a first computing system coupled to the first controller.

21. The computer readable medium of claim 17 further comprising:
   removing the first wireless device identity information from a list of authorized second group wireless devices.

* * * * *